Figure 1:
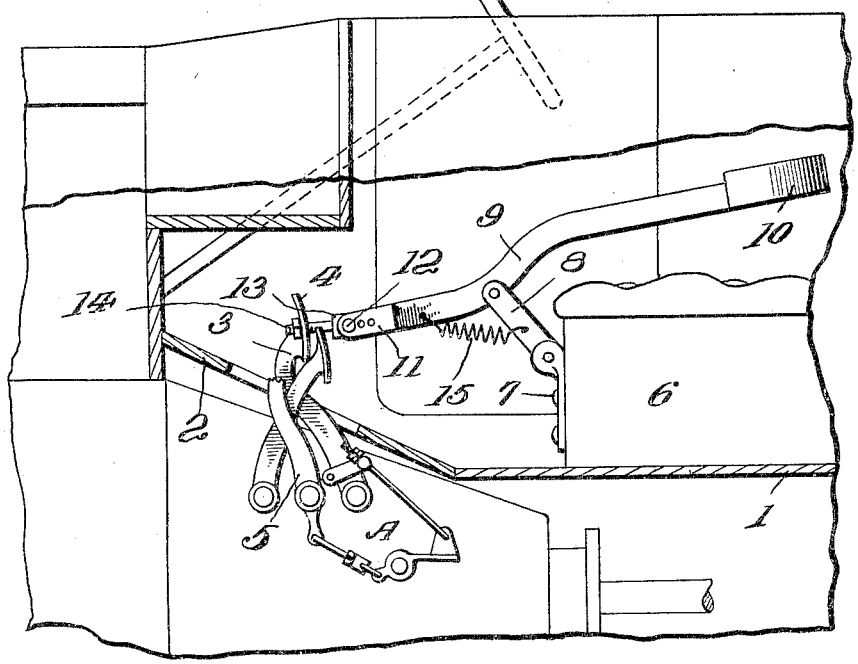

F. H. STOCKING AND W. M. FARROW, Sr.
ARM OPERATED BRAKE CONTROL.
APPLICATION FILED JAN. 25, 1919.

1,326,377.

Patented Dec. 30, 1919.

Inventors
F. H. Stocking and
W. M. Farrow Sr.

By
Attorney

UNITED STATES PATENT OFFICE.

FANNY H. STOCKING AND WILLARD M. FARROW, SR., OF WASHINGTON, DISTRICT OF COLUMBIA.

ARM-OPERATED BRAKE CONTROL.

1,326,377.     Specification of Letters Patent.     Patented Dec. 30, 1919.

Application filed January 25, 1919. Serial No. 273,128.

*To all whom it may concern:*

Be it known that we, FANNY H. STOCKING and WILLARD M. FARROW, Sr., citizens of the United States, residing at Washington, in the District of Columbia, have invented certain new and useful Improvements in Arm-Operated Brake Controls, of which the following is a specification, reference being had therein to the accompanying drawing.

This invention relates to a brake control for automobiles, the object being to provide means for actuating the brake by a lever so mounted within the automobile and connected to the brake pedal that the brake can be applied by exerting a downward pressure on the lever with the arm or the hand of the operator, whereby the brake can be applied by a legless person.

Another object of our invention is to provide a brake control which is especially adapted to be used in connection with the Ford type of automobile, and one which is exceedingly cheap and simple in construction which enables the same to be readily applied without changing the construction in any way.

Other and further objects and advantages of the invention will be hereinafter set forth and the novel features thereof defined by the appended claims.

Figure 2:
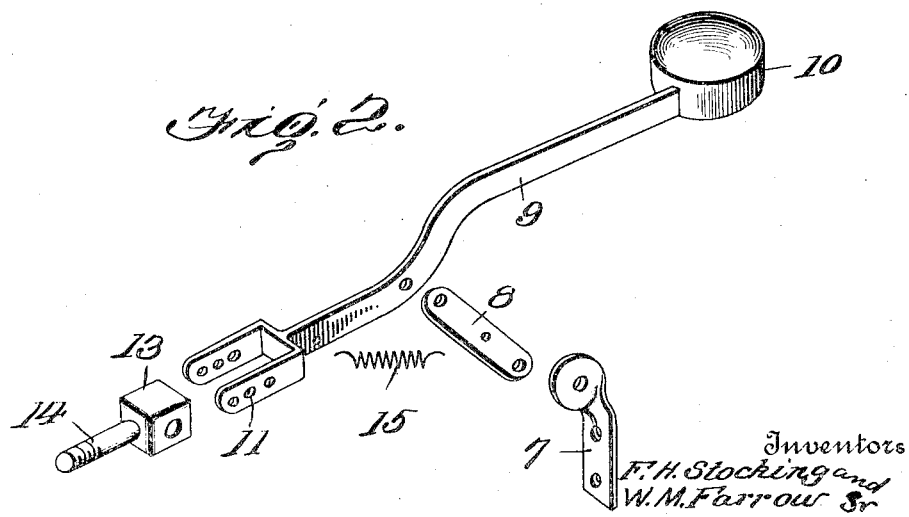

In the drawings:

Figure 1 is a longitudinal vertical section through a portion of the body of an automobile, showing the application of our improved construction of brake control, and Fig. 2 is a perspective view of the brake controlling device, detached.

Referring to the drawing 1 indicates the body of an automobile having a foot-board 2 through which extends the brake-lever 3 which is provided with a pedal 4. The brake-lever has a connection A with the clutch-lever 5 forming means for automatically disengaging the transmission clutch, when the brake pedal is operated, the form of connection shown being well known in the art, and forms no part of our invention.

The body 1 is provided with the usual seat frame 6, to which is connected a bracket 7 on which is mounted a pivoted link 8 carrying an operating lever 9 extending over the seat, and provided at its end with a recessed disk 10 adapted to receive the elbow of the operator, which enables the lever to be operated by exerting a slight downward pressure thereon, without the operator removing his hands from the steering wheel. The lower end of the lever is provided with a fork, the arms of which are provided with a series of openings 11 through which a bolt 12 is adapted to pass for adjustably mounting the head 13 of a threaded stem 14 which is adapted to be screwed into a threaded bore formed in the pedal 4, and secured by a nut as clearly shown. By this construction the lever is adjustably connected to the brake pedal so as to allow the same to be correctly set.

In order to return the operating lever 9 to its normal position, after it has been operated, we connect the lever to the link 8 by a coil-spring 15, but it is of course understood that this can be accomplished in other ways, without departing from the spirit of our invention. By mounting the lever on a pivoted link it only requires a slight pressure on the operating lever to exert sufficient pressure on the brake pedal to apply the brake with sufficient force to stop the automobile quickly.

From the foregoing description, it will be seen that we have provided a brake operating device for motor vehicles of the Ford type, which enables a person to actuate the brake with the arm or hand, and by the connection with the clutch, the clutch will be disengaged when the brake is applied, the operating device being composed of a lever and a link so mounted in the automobile, that it will not be in the way of the operator which allows the machine to be operated in the ordinary manner.

What we claim is:

1. An automobile having a brake pedal, a spring returned lever mounted in said automobile having its upper end extending above the seat of the automobile and means for connecting the lower end of said lever to said pedal.

2. In a motor vehicle, the combination with a brake pedal thereof, of a pivoted link, a lever carried by said link, and means for connecting said lever to said pedal.

3. In a motor vehicle, the combination with the brake pedal thereof of a spring returned lever extending above the seat of the vehicle provided with an arm receiving member and means for adjustably connecting the lower end of said lever to said pedal.

4. A brake controlling device for automobiles, comprising a bracket, a brake pedal, a link pivotally mounted on said bracket, an operating lever carried by said link, and means for connecting said lever to the brake pedal.

5. A brake controlling device for automobiles comprising a bracket, adapted to be connected to the seat of the automobile, a link pivotally mounted on said bracket, an operating lever carried by said link, means for adjustably connecting said lever to the brake pedal, and a spring connecting said lever to said link.

6. In a motor vehicle, the combination with a brake pedal having a connection with the clutch thereof, of a pivoted link, a lever carried by said link, and means for adjustably connecting said lever to said pedal.

7. A brake controlling device for automobiles comprising a support, a link pivotally mounted in said support, an operating lever carried by said link having a fork at its lower end, a headed bolt mounted in the brake pedal, means for adjustably mounting said headed bolt in the fork of said lever, said operating lever extending above the seat of the automobile and provided with a recessed disk for receiving the elbow of the operator.

FANNY H. STOCKING.
WILLARD M. FARROW, Sr.